United States Patent [19]

McGraw et al.

[11] 4,041,019
[45] Aug. 9, 1977

[54] DELAYED-ACTION, HEAT ACTIVATED-URETHANE CATALYST

[75] Inventors: Philip W. McGraw, Angleton, Tex.; George A. Doorakian, Bedford, Mass.; Randall C. Rains, Denton, Tex.

[73] Assignee: The Dow Chemical Company, Midland, Mich.

[21] Appl. No.: 624,698

[22] Filed: Oct. 22, 1975

[51] Int. Cl.² .................. C08G 18/20; C08G 18/14
[52] U.S. Cl. .................. 260/75 NC; 260/2.5 AC; 260/77.5 AC; 548/301
[58] Field of Search ... 260/2.5 AC, 75 NC, 77.5 AC, 260/309

[56] References Cited

U.S. PATENT DOCUMENTS

| | | | |
|---|---|---|---|
| 3,152,094 | 10/1964 | Erner et al. | 260/2.5 AC |
| 3,177,223 | 4/1965 | Erner | 260/2.5 AC |
| 3,446,779 | 5/1969 | Finelli et al. | 260/75 NC |
| 3,448,065 | 6/1969 | Green | 260/2.5 AC |
| 3,728,291 | 4/1973 | Carroll et al. | 260/75 NC |
| 3,868,458 | 2/1975 | Baker et al. | 260/309 |
| 3,912,689 | 10/1975 | Bechara et al. | 260/2.5 AC |
| 3,962,184 | 6/1976 | Notomi et al. | 260/77.5 AC |
| 3,991,071 | 11/1976 | Brookes et al. | 260/309 |

*Primary Examiner*—H.S. Cockeram
*Attorney, Agent, or Firm*—L. Wayne White

[57] ABSTRACT

New catalysts are described for promoting the reaction of organic isocyanates with organic compounds bearing active hydrogen. These new catalysts correspond to the formula

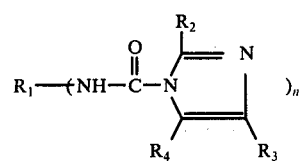

I wherein: $n$ is an integer of from 1 to 3;
$R_1$ is an n-valent organic radical;
$R_2$ is hydrogen, hydrocarbyl or inertly-substituted hydrocarbyl;
$R_3$ and $R_4$ are each independently hydrogen, hydrocarbyl, inertly-substituted hydrocarbyl, or, $R_3$ and $R_4$ are joined to form a 5- or 6-membered carbocyclic ring. The catalysts are delayed-action, heat-activated catalysts which are particularly useful in the preparation of polyurethanes.

9 Claims, No Drawings

DELAYED-ACTION, HEAT ACTIVATED-URETHANE CATALYST

BACKGROUND OF THE INVENTION

1. Field of the Invention

This invention pertains to new catalysts for promoting the reaction between organic isocyanates and organic compounds bearing active hydrogen (i.e., active in the Zerewitinoff test). The new catalysts are particularly useful in promoting the reaction of organic isocyanates with aliphatic hydroxyl compounds to produce urethanes.

2. Description of the Prior Art

Reactions of isocyanates with compounds bearing active hydrogen are well known. This type of reaction is used, for example, to produce urethanes (i.e. carbamates), ureas, etc. Commericially, the most important reaction is in the production of polyurethanes by the reaction of ployisocyanates with aliphatic polyols.

Various catalysts have been used in promoting the the urethane reaction, but the most common commercial catalyst is 1,4-diazabicyclo[2.2.2]octane. This particular compound as well as certain other tertiary amines are very effective. Indeed, 1,4-diazabicyclo[2.2.2]octane is so effective that the "pot life"of the reaction mixture is very short and this presents a processing problem in commercial applications (such as carpet foam-backing, etc.) which require that the reaction mixture be doctorable for a period of time.

Erner et.al. described a class of imidazole catalysts in U.S. Pat. No. 3,152,094 that was said to be unreactive in the mixture of urethane reactants at ambient temperatures but highly effective catalysts at moderately elevated temperatures (e.g. about 75°C). These catalysts were represented by the formula

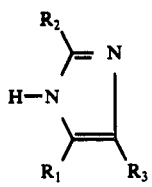

II wherein $R_2$ is hydrogen, alkyl or benzyl; $R_1$ and $R_3$ are hydrogen, alkyl, benzyl, or joined to form a 6-membered carbocyclic ring, provided that the total number of carbon atoms in the substituents $R_1$, $R_2$ and $R_3$ does not exceed 12. The disclosure of Erner et. al. (U.S. Pat. No. 3,152,094) is hereby incorporated by reference.

SUMMARY OF THE INVENTION

A new class of catalysts has now been discovered having even greater efficiency at latent catalysts in promoting the reaction of isocyanates with compounds bearing active hydrogen. The new class of catalysts is represented by the formula

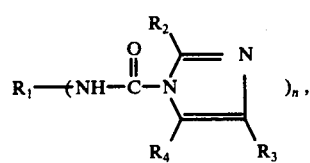

I wherein: $n$ is an integer of from 1 to 3;

$R_1$ is an n-valent organic radical;

$R_2$ is hydrogen, hydrocarbyl or inertly-substituted hydrocarbyl;

$R_3$ and $R_4$ are each independently hydrogen, hydrocarbyl, inertly-substituted hydrocarbyl, or, $R_3$ and $R_4$ are joined to form a 5- or 6-membered carbocyclic ring. The catalysts are delayed-action, heat-activated catalysts which are particularly useful in the preparation of urethanes.

DETAILED DESCRIPTION OF THE INVENTION

The new catalysts, as represented by formula (I), are conveniently prepared by reacting an organic isocyanate bearing from 1 to 4 isocyanato groups with an imidazole. This reaction is represented by the following equation

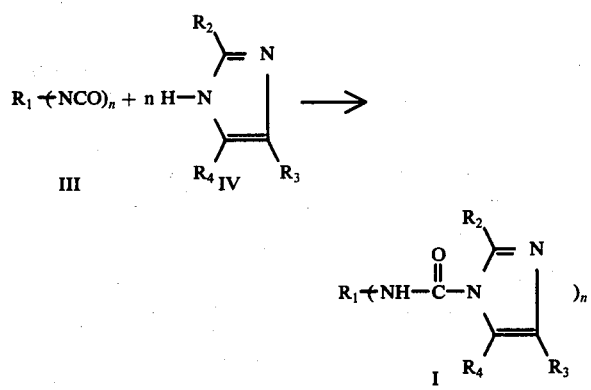

The above reaction is a very facile reaction. Normally it is conducted by merely blending the reactants in essentially stoichiometric amounts at room temperature under substantially anhydrous conditions. The use of an inert solvent (e.g. methylene chloride) is advantageous since this facilitates contact of the reacting moietoes. Likewise, slightly elevated temperatures (e.g. up to about 50°C) may be used to increase the rate of reaction between certain combinations of isocyanates and imidazoles.

The new catalysts are normally solid compounds and are subject to hydrolysis. Prolonged contact with moist air will result, for example, in the slow hydrolytic decomposition of the compounds. Therefore, normal precautions should be used in storing and handling the catalysts to prevent such decomposition.

The isocyanate reactants used in forming the instant class of catalyst are represented by III above. Such isocyanate reactants form a known class of compounds havng many members; any member of which can be used herein. E.g., aliphatic isocyanates, aromatic isocyanates, inertly-substituted aliphatic isocyanates, or inertly-substituted aromatic isocyanates, and the like. Examples of such isocyanates include methyl isocyanate, ethyl isocyanate, butyl isocyanate, octyl isocyanate, octadecyl isocyanate, tetramethylene diisocyanate, hexamethylene diisocyanate, ethylene diisocyanate, thiodiethylene diisocyanate, oxydiethylene diisocyanate, phenyl isocyanate, toluene diisocyanate, methylene diphenyl diisocyanate, polymethylene polyphenyl isocyanate, chlorophenyl isocyanate, dichlorophenyl isocyanate, benzylphenyl diisocyanate, methoxyphenyl isocyanate, butylphenyl isocyanate, vinyl isocyanate, cyclohexyl isocyanate those represented by the formula

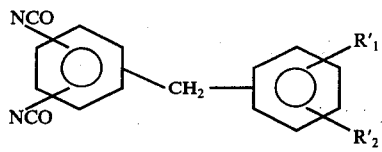

where R′$_1$ is hydrogen or C$_1$ to C$_4$ alkyl and R′$_2$ is chloro or C$_1$ to C$_4$ alkyl, and

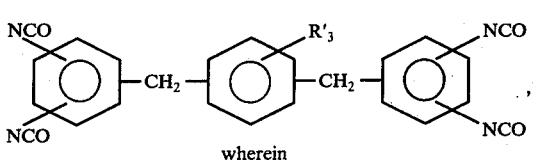

wherein R′$_3$ is hydrogen or chloro, and the like. Any organic isocyanate bearing from 1 to 4 isocyanato groups can be used in this reaction. However, due to the very high toxicity of the lower aliphatic isocyanates, we prefer to use isocyanates having at least 6 carbon atoms in R$_1$ and we most prefer to use aromatic isocyanates in preparing our new catalysts.

The imidazoles, represented by formula (IV) above, likewise form a known class of compounds having many members; any member of which can be suitably used herein. Examples of suitable such imidazoles include imidazole, 2-methyl imidazole, 2-butyl imidazole, 2-decyl imidazole, 4-methyl imidazole, 4-methyl imidazole, 5-methyl imidazole, 4,5-dimethyl imidazole, benzimidazole, 2-benzyl imidazole, 2-benzyl-4-methyl imidazole, and the like. 2-Methyl imidazole is the most preferred imidazole for use in preparing our new catalysts.

The instant class of catalysts are used in small but catalytic amounts in promoting the reaction between organic isocyanates and organic compounds bearing active hydrogen and reactive with the isocyanates. Normally, amounts of from about 0.1 to about 20 weight percent, based on the weight of isocyanate reactant, is sufficient to yield an acceptable reaction rate at an elevated temperature.

The use of the instant catalyst in the production of polyurethanes is illustrative of their catalytic activity in promoting reaction between isocyanates and organic compounds bearing active hydrogen. The use of the instant catalyst in preparing polyurethanes also represents a preferred use for the instant catalyst. In this utility, any polyol conventionally employed in the preparation of urethanes can be employed in the process of the present invention. Such polyols include polyether polyols, polyester polyols, and the like or mixtures thereof. Such polyols are described in the literature, as illustrated by "Polyurethanes: Chemistry and Technology, parts I and II", by Saunders and Frisch, Interscience, 1964. Paricularly suitable polyols include polyether polyols having from 2 to 4 hydroxyl groups per molecule and an average molecular weight of from about 3,000 to about 7,000.

Any organic polyisocyanate conventionally employed in the preparation of urethanes can be employed in the process of the instant invention. This also includes isocyanato-containing prepolymers prepared by reacting various polyols with polyisocyanates and thus producing a product having residual isocyanate groups. Such polyisocyanates are likewise described in the Saunders and Frisch publication mentioned above and also in the patent literature. See, for example, Robins (U.S. Pat. No. 3,583,945), Kamal & Rogier (U.S. Pat. No. 3,455,883), etc. Particularly suitably polyisocyanates include, for example, toluene diisocyanate, methylene diphenyl diisocyanate, and polymethylene polyphenyl isocyanates In addition to the polyisocyanate and polyol reactants and the instant delayed action catalyst, the thermally curable polyurethane composition may likewise comprise blowing or foaming agents, cell control agents, amine and/or organo-metal catalysts, inert fillers, and the like. Such ingredients are likewise discussed in the Saunders and Frisch publication and the patent literature. Particularly suitable amine catalysts mentioned therein include, for example, triethylenediamine, N-ethylmorpholine, N-(dimethylaminoethyl) piperazine, N-N'-bis (trimethylaminoethyl)piperazine, tetramethylbutanediamine, dimethylethanolamine, bis(2-dimethyl aminoethyl) ether, mixtures thereof and the like. Particularly suitable organo-metal catalysts include stannous octoate, dibutyltin dilaurate, and the like. Other organo-metal catalysts are tin-sulfur catalysts represented by the formula

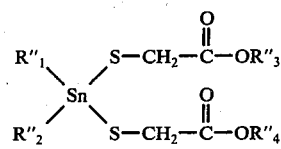

wherein R″$_1$ and R″$_2$ are independently hydrocarbon groups having from 1 to about 8 carbon atoms and R″$_3$ and R″$_4$ are independently hydrocarbon groups having from 1 to about 18 carbon atoms. Such sulfur-containing organo-tin compounds are commercially available from Argus Chemical Corporation as Markure UL-6, Markure UL-29, LRB-1355-331 and LRB-1355-383 and from M and T Chemicals as Thermolite 31.

Methods of formulating the various polyurethanes and the fillers (e.g. silica, aluminum trihydrate, calcium carbonate, barium sulfate, carbon black, mica, titanium dioxide, and the like) are well known to those skilled in the polyurethane art. The following examples, however, will further illustrate the use of the instant catalysts in preparing various polyurethane formulations.

EXAMPLE 1

Preparation of the Instant Catalysts

A reaction vessel fitted with a thermometer, water condenser, mechanical stirrer and powder-addition funnel was charged with a solution of 500 g (4.2 mol) of phenyl isocyanate in 1 liter of dry methylene chloride. The methylene chloride was predried with molecular sieves. To this solution was added slowly, and with vigorous stirring, 330 g (4.03 mol) of solid 2-methyl imidazole. The 2-methyl imidazole dissolved instantly in the reaction mixture and reacted readily with the phenyl isocyanate. During the addition, the temperature of the reaction mixture rose from ambient to about 30° C with a white crystalline product precipitating from solution. The temperature of the reaction mixturre was then maintained at about 30° C by monitoring the rate of addition of 2-methylimidazole to the reacton and by external cooling. Total addition time for the 2-methylimidazole was 1 hour. The reaction mixture thus obtained comprised a white crystalline solid suspended in methylene chloride. This mixture was stirred for an additional 2 hours after all of the 2-methyl imidazole was added. The product was subsequently recovered by filtration, washed twice with 300 ml portions of dry carbon tetrachloride (to remove excess phenyl isocyanate), air dried, and placed in a vacuum oven at room temperature for 12 hours. The product thus obtained was a white crystalline solid weighing 750 g (88.0 percent of theory) and melting at a temperature of from 103°–106°C.

The other catalysts used herein were similarly prepared.

EXAMPLE 2

A catalyst corresponding to the structure

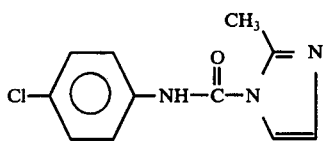

was prepared by reacting p-chlorophenyl isocyanate with 2-methlimidazole. Two grams of this catalyst was dissolved in 30 ml of tetrahydrofuran (THF). This solution was mixed with 165 g of a urethane prepolymer having an isocyanate equivalent weight of 140. This prepolymer was prepared by reacting an adduct of glycerine and propylene oxide having an average hydroxy equivalent weight of about 86 with toluene diisocyanate in such proportions as to give a product having 30 weight percent reactive isocyanato groups. The THF was subsequently removed from this mixture by vacuum distillation leaving the catalyzed prepolymer as a slightly cloudy liquid.

The above catalyzed prepolymer, 166 g, was blended with (1) 400 g of a polyether polyol mixture containing (a) 90 weight percent of a glycerine-initiated polyoxypropylene glycol capped with ethylene oxide and having an average molecular weight of 4950 and a hydroxy equivalent weight of 1650; and (b) 10 weight percent of diethylene glycol, and (2) 200 g of alumina trihydrate (marketed by the Reynolds Alumina Company under the designation RH31F). These components were mixed in a Kitchen Aid K45 mixer and frothed at the highest speed of the K45 mixer for 5 minutes. A froth was thus produces having excellent doctorability. A thin layer, 3/16 inch thick, was doctored (i.e. spread) onto a molding board and put into a forced air oven at 120° C for 5 minutes. When this froth was removed from the oven, it was completely tack-free and cross-linked (i.e. cured). Another sample of the froth was poured into a cup and maintained at room temperature for several minutes. Some temperature rise (up to about 35° C) was observed but there was no appreciable gelling in the reaction mixture and the froth was still very workable even after 10 minutes By way of comparison, a conventional catalyst (e.g. triethylene diamine) at a concentration necessary for the final cure in 15 minutes in a 120° C oven would have gelled in the bowl of the K45 mixer.

EXAMPLES 3–22

The following catalysts were used in place of the p-chlorophenyl isocyanate/2-methyl imidazole reaction product in the above formulation. Each of the following compounds were effective delayed-action, heat-activated catalysts. Compounds 6–10, 12–14 and 16 were particularly effective delayed-action, heat-activated catalysts.

| Ex. | Reactants | Catalyst Products |
|---|---|---|
| 3 |  | 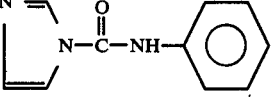 |
| 4 | 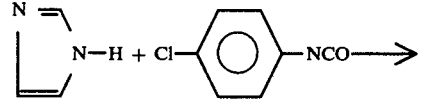 | 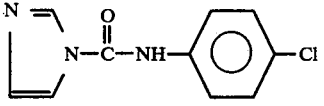 |
| 5 | 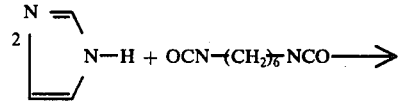 | 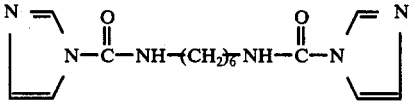 |
| 6 | 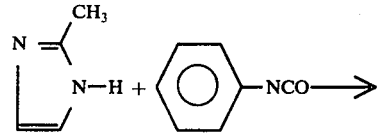 | 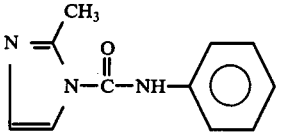 |
| 7 | 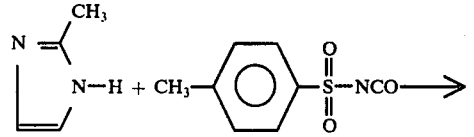 | 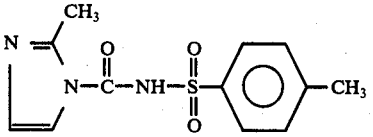 |

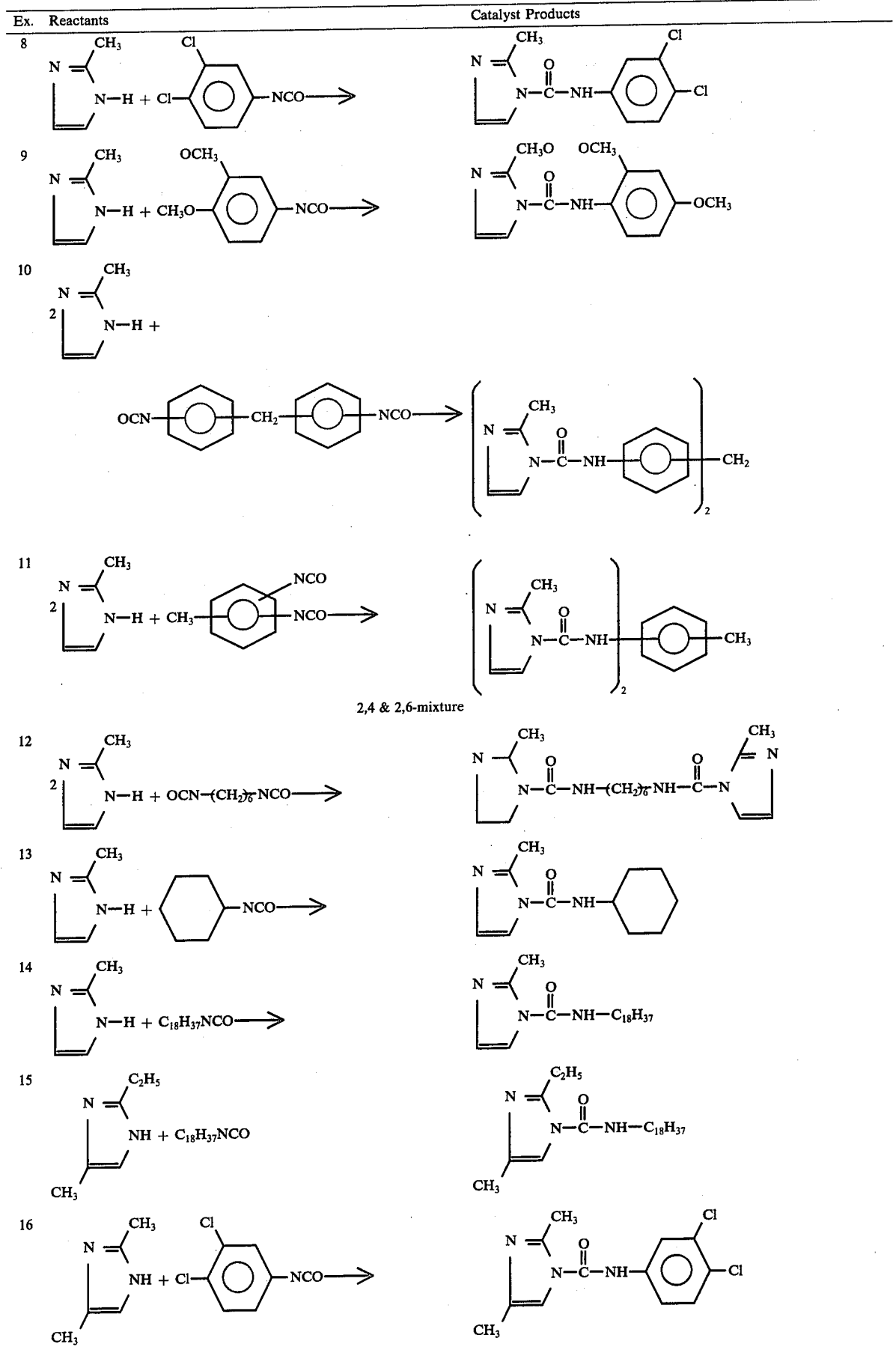

-continued

| Ex. | Reactants | Catalyst Products |
|---|---|---|
| 17 | 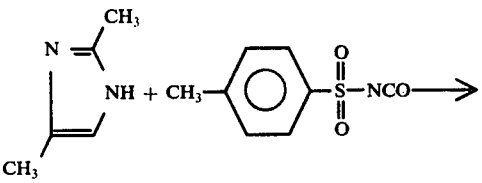 | 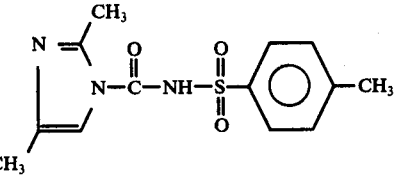 |
| 18 | 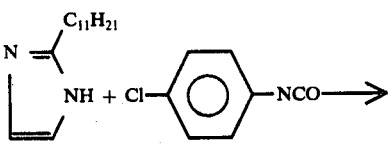 | 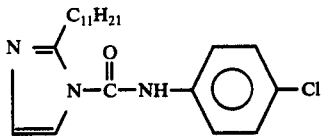 |
| 19 | 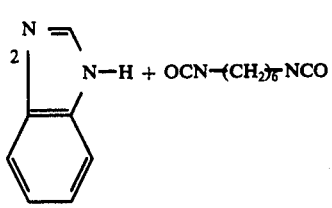 | 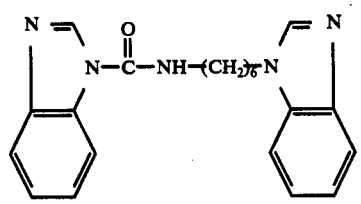 |
| 20 | 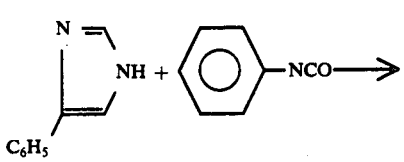 | 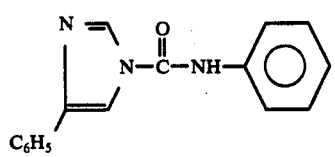 |

Other compounds within formula I can be similarly prepared and used.

What is claimed is:

1. A composition comprising
 a. an organic compound bearing at least one reactive isocyanato group;
 b. an organic compound bearing active hydrogen; and
 c. a small but sufficient amount of a catalyst to catalyze the reaction between the isocyanato group in (a) and the active hydrogen in (b); said catalyst corresponding to the formula

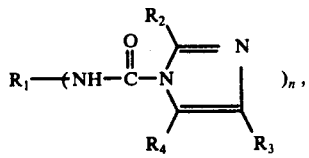

wherein: n is an integer of from 1 to 3;
$R_1$ is an n-valent organic radical
$R_2$ is hydrogen, hydrocarbyl or inertly-substituted hydrocarbyl;
$R_3$ and $R_4$ are each independently hydrogen, hydrocarbyl, inertly-substituted hydrocarbyl, or, $R_3$ and $R_4$ are joined to form a 5- or 6-membered carbocylic ring.

2. The composition defined by claim 1 in which (b) is an organic compound bearing alcoholic hydroxyl groups.

3. The composition defined by claim 1 in which (a) is an organic polyisocyanate and (b) is an aliphatic polyol.

4. The composition defined by claim 3 in which (b) is a polyether polyol or a polyester polyol.

5. The composition defined by claim 1 in which $R_1$ is an n-valent carbocyclic aromatic ring or an inertly-substituted n-valent carbocyclic aromatic ring having at least 6 carbon atoms.

6. The composition defined by claim 5 in which $R_1$ is phenyl or an inertly-substituted phenyl and n is 1 or 2.

7. The composition defined by claim 5 in which $R_1$ is phenyl or tolyl.

8. The composition defined by claim 1 in which $R_3$ and $R_4$ are each hydrogen and $R_2$ is methyl.

9. The composition defined by claim 7 in which $R_1$ corresponds to the formula

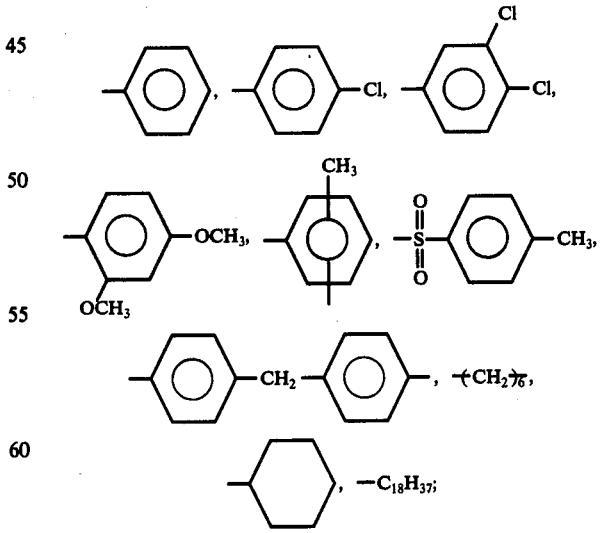

(a) is an organic polyisocyanate having from 2 to 4 isocyanato groups per molecule; and (b) is an aliphatic polyol.

* * * * *